US012790416B2

(12) United States Patent
Sumerin et al.

(10) Patent No.: US 12,790,416 B2
(45) Date of Patent: Nov. 10, 2026

(54) (CO)POLYMERIZATION OF ETHYLENE

(71) Applicant: Borealis AG, Vienna (AT)

(72) Inventors: Victor Sumerin, Porvoo (FI); Markku Vahteri, Porvoo (FI)

(73) Assignee: Borealis AG, Vienna (AT)

( * ) Notice: Subject to any disclaimer, the term of this patent is extended or adjusted under 35 U.S.C. 154(b) by 911 days.

(21) Appl. No.: 17/914,080

(22) PCT Filed: Apr. 9, 2021

(86) PCT No.: PCT/EP2021/059253
§ 371 (c)(1),
(2) Date: Sep. 23, 2022

(87) PCT Pub. No.: WO2021/204979
PCT Pub. Date: Oct. 14, 2021

(65) Prior Publication Data

US 2023/0117202 A1 Apr. 20, 2023

(30) Foreign Application Priority Data

Apr. 9, 2020 (EP) .................................... 20168977

(51) Int. Cl.
*C08F 110/02* (2006.01)
*C08F 2/00* (2006.01)
(Continued)

(52) U.S. Cl.
CPC ............ *C08F 110/02* (2013.01); *C08F 2/001* (2013.01); *C08F 4/651* (2013.01); *C08F 4/6548* (2013.01);
(Continued)

(58) Field of Classification Search
CPC ........ C08F 110/02; C08F 2/001; C08F 4/651; C08F 4/6548; C08F 2410/06; C08F 210/16; C08L 23/0815; C08L 2314/02
See application file for complete search history.

(56) References Cited

U.S. PATENT DOCUMENTS 6,054,542 A * 4/2000 Kojoh ..................... C08F 10/02
526/125.4
2014/0058053 A1* 2/2014 Fang ......................... C08F 4/52
526/125.3
(Continued)

FOREIGN PATENT DOCUMENTS

CN 104854145 A 8/2015
CN 107207662 A 9/2017
(Continued)

OTHER PUBLICATIONS

Office Action with English translation for Indian Patent Application No. 202217060779 mailed on Feb. 13, 2024, 8 pages.
(Continued)

*Primary Examiner* — Alicia Bland
(74) *Attorney, Agent, or Firm* — Lowenstein Sandler LLP

(57) ABSTRACT

The present application relates to a process for producing ethylene polymer in a polymerization process comprising polymerisation of ethylene, optionally with comonomers selected from $C_3$-$C_{20}$-alpha-olefins, preferably selected from $C_4$-$C_{10}$-alpha-olefins, in the presence of a Ziegler-Natta catalyst under polymerisation conditions in at least one polymerisation stage carried out in a solution, slurry or gas-phase reactor or in combinations thereof, wherein the Ziegler-Natta catalyst comprises (A) a solid Ziegler-Natta catalyst component and (B) a cocatalyst, wherein the solid Ziegler-Natta catalyst component (A) comprises a solid
(Continued)

support of a Mg compound, a transition metal of Group 4 to 6 and an internal electron donor.

20 Claims, 2 Drawing Sheets

(51) Int. Cl.
*C08F 4/651* (2006.01)
*C08F 4/654* (2006.01)
*C08L 23/0807* (2025.01)

(52) U.S. Cl.
CPC ....... *C08L 23/0815* (2013.01); *C08L 2314/02* (2013.01)

(56) References Cited

U.S. PATENT DOCUMENTS

| | | | | |
|---|---|---|---|---|
| 2015/0152199 | A1* | 6/2015 | Bantu | C08F 110/00 502/127 |
| 2015/0322177 | A1* | 11/2015 | Jayaratne | C08F 10/02 526/124.9 |
| 2017/0349683 | A1* | 12/2017 | Sumerin | C08F 210/16 |
| 2019/0270690 | A1* | 9/2019 | Xu | C07C 31/30 |

FOREIGN PATENT DOCUMENTS

| | | | |
|---|---|---|---|
| EP | 106108 | A1 | 4/1984 |
| EP | 0428054 | A1 | 5/1991 |
| EP | 0668296 | A1 | 8/1995 |
| EP | 1061088 | A1 | 12/2000 |
| EP | 1283222 | A1 | 2/2003 |
| EP | 2872538 | A1 | 5/2015 |
| EP | 3495420 | A1 | 6/2019 |
| EP | 3533776 | A1 | 9/2019 |
| JP | 2010001420 | A | 1/2010 |
| JP | 2015503646 | A | 2/2015 |
| WO | 9212182 | A1 | 7/1992 |
| WO | 9618662 | A1 | 6/1996 |
| WO | 2006063771 | A1 | 6/2006 |
| WO | 2010054732 | A1 | 5/2010 |
| WO | 2014004396 | A1 | 1/2014 |
| WO | 2014013401 | A1 | 1/2014 |
| WO | 2016097193 | A1 | 6/2016 |
| WO | 2019081529 | A1 | 5/2019 |
| WO | 2019129797 | A | 7/2019 |

OTHER PUBLICATIONS

International Search Report for PCT/EP2021/059253 mailed Jun. 24, 2021, 16 pages.

First Office Action for with English translation for Chinese Patent Application No. 202180024112.9 mailed on Mar. 9, 2023, 21 pages.

Office Action with English translation for Japanese Patent Application No. 2022557675 mailed on Aug. 29, 2023, 7 pages.

Hearing Notice for Indian Patent Applicatin No. 202217060779 dated Aug. 2, 2024, 3 pages.

* cited by examiner

(CO)POLYMERIZATION OF ETHYLENE

CROSS-REFERENCE TO RELATED APPLICATION(S)

The present application is a national stage entry under 35 U.S.C. § 371 of International Application No. PCT/EP2021/059253, filed on Apr. 9, 2021, which claims priority to European Patent Application No. 20168977.5, filed on Apr. 9, 2020. The contents of these applications are hereby incorporated by reference in their entirety.

FIELD OF THE DISCLOSURE

The present invention relates to an olefin polymerization process, especially a process for producing ethylene (co) polymers utilizing particular Ziegler-Natta catalyst components to obtain ethylene (co)polymers, in particular in a multi-stage process with desired benefits, especially as regards to improved molecular weight (Mw) capability and comonomer response, and further with improved activity balance between the polymerisation stages and improved structural integrity of (co)polymers.

BACKGROUND OF THE DISCLOSURE

Ziegler-Natta (ZN) type polyolefin catalysts are well known in the field of producing polyolefins, like ethylene (co)polymers. Generally the catalysts comprise at least a catalyst component formed from a transition metal compound of Group 4 to 6 of the Periodic Table (IUPAC, Nomenclature of Inorganic Chemistry, 2005), a metal compound of Group 1 to 3 of the Periodic Table (IUPAC), optionally a compound of Group 13 of the Periodic Table (IUPAC), and typically an internal donor. A ZN catalyst may also comprise further catalyst component(s), such as a cocatalyst and optionally an external donor.

The catalyst composition used for the production of polyolefins, such as the ethylene (co)polymers, determines i.a. the properties of the polymers. Thus, the catalyst composition allows for a “tailoring” of the properties of the produced resins.

WO2016097193 describes a catalyst component for ethylene (co)polymerisation prepared from solid carrier particles of $MgCl_2$*mROH adduct and loading on the particles an aluminium compound, internal electron donor and a titanium compound.

WO2014004396 describes a ZN catalyst for propylene polymerisation providing polypropylene with low XS (high isotacticity) and high MFR.

EP1061088 and EP1283222 of Toho describe solid ZN catalysts for use in propylene polymerisation. Catalysts are prepared from solid magnesium dialkoxide, titanium compound and internal electron donor, especially esters of phthalic acids and maleic acids.

BRIEF DESCRIPTION OF THE DISCLOSURE

An object of the present invention is to provide a process for producing ethylene polymer in a polymerization process comprising polymerisation of ethylene, optional with comonomers selected from $C_3$-$C_{20}$-alpha-olefins, in the presence of a Ziegler-Natta catalyst, which provides improved properties and performance over the prior art. The catalyst used in the process according to the present invention is environmentally sustainable and supports the preparation of ethylene (co)polymers with a desirable molecular weight and improved structural integrity of (co)polymers.

The object of the disclosure is achieved by a process for producing ethylene polymer in a polymerization process comprising polymerisation of ethylene, optional with comonomers selected from $C_3$-$C_{20}$-alpha-olefins, in the presence of a particular Ziegler-Natta catalyst, which is characterized by what is stated in the independent claim. The preferred embodiments of the disclosure are disclosed in the dependent claims.

BRIEF DESCRIPTION OF THE DRAWINGS

In the following, the disclosure will be described in greater detail by means of preferred embodiments with reference to the accompanying drawings of FIGS. 1-4.

DETAILED DESCRIPTION OF THE DISCLOSURE

Figure 1:
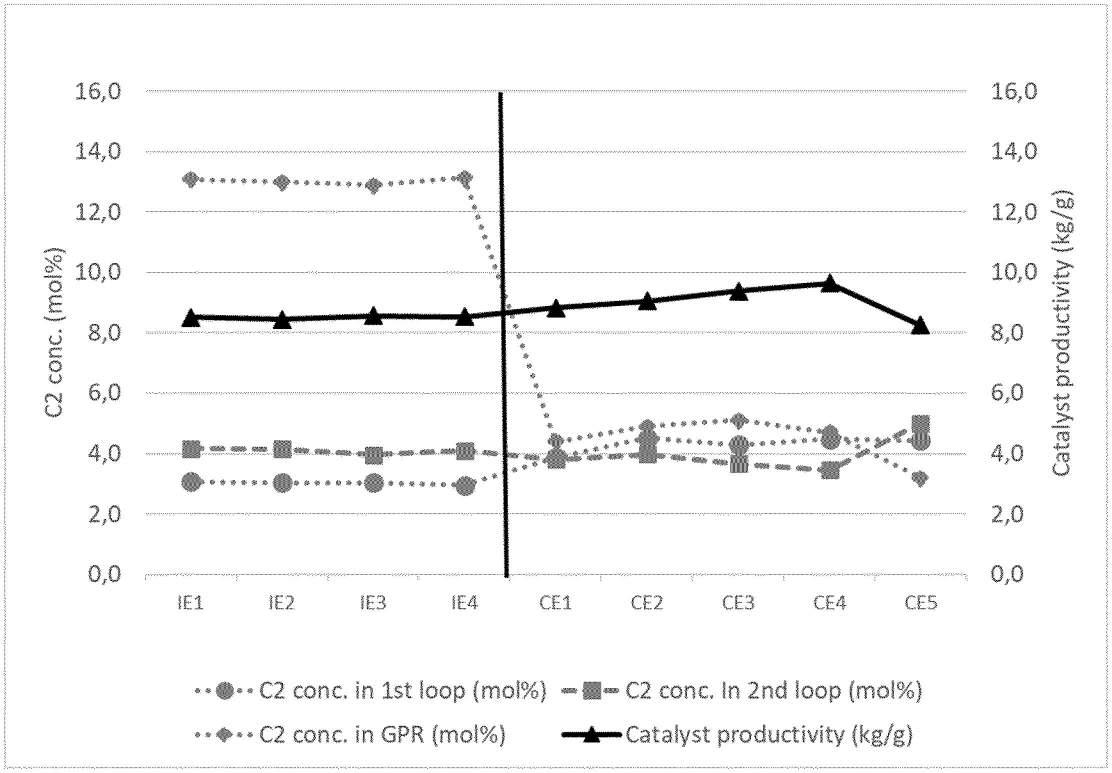
FIG. 1 illustrates ethylene concentration in different reactors of a multi-stage reactor configuration for producing ethylene-hexene copolymer with comparative and inventive catalysts and their productivities.

Surprisingly, it has now been found that the use of a Ziegler-Natta catalyst comprising a particular solid Ziegler-Natta catalyst component provides excellent performance of the catalyst, increased molecular weight ($M_w$) capability, comonomer response, and further with improved activity balance between the polymerisation stages and improved structural integrity of (co)polymers, in particular when utilized in a multi-stage process for producing ethylene (co) polymers. The particular solid Ziegler-Natta catalyst component is obtainable, preferably obtained, by a method as herein described and claimed.

Provided herein is a process for producing ethylene polymer in a polymerization process comprising polymerisation of ethylene, optionally with comonomers selected from $C_3$-$C_{20}$-alpha-olefins, preferably selected from $C_4$-$C_{10}$-alpha-olefins, in the presence of a Ziegler-Natta catalyst under polymerisation conditions in at least one polymerisation stage carried out in a solution, slurry or gas-phase reactor or in combinations thereof, wherein the Ziegler-Natta catalyst comprises (A) a solid Ziegler-Natta catalyst component and (B) a cocatalyst wherein the solid Ziegler-Natta catalyst component (A) is obtained by a method comprising the steps of (a) contacting a solid magnesium alkoxide compound, with a-i) a first compound of a transition metal of Group 4 to 6 of IUPAC Periodic table, preferably a tetravalent titanium compound, and a-ii) a first internal electron donor compound to obtain a solid catalyst precursor;

(b) optionally washing the solid catalyst precursor of step (a);
(c) contacting the solid catalyst precursor of step (a) or (b) with
c-i) a second compound of a transition metal of Group 4 to 6 of IUPAC Periodic table, preferably a tetravalent titanium compound, and
c-ii) a second internal donor compound;
(d) washing the product of step (c); and
(e) recovering the solid Ziegler-Natta catalyst component.

(A) Solid Ziegler-Natta Catalyst Component

The term "Ziegler-Natta catalyst component" as used herein and hereafter refers to a procatalyst of a Ziegler-Natta catalyst or a Ziegler-Natta catalyst system, which have the same meaning in this application, comprising said procatalyst, i.e. the Ziegler-Natta catalyst component of the present invention, comprising a compound of a transition metal of Group 4 to 6, a compound of Group 1 to 3 metal, preferably magnesium, and an internal electron donor, as herein defined.

The IUPAC Periodic Table refers here to the Periodic Table (IUPAC, Nomenclature of Inorganic Chemistry, 2005).

In particular, the Ziegler-Natta catalyst component refers to a catalyst component formed from a magnesium alkoxide compound, a compound of Group 4 metal, especially Ti compound, and an internal electron donor.

The present solid Ziegler-Natta catalyst component is preferably prepared from compounds comprising i. solid particles of magnesium dialkoxide of formula $Mg(OR)_2$, wherein each R is independently $C_{1-4}$-alkyl, preferably $C_{1-3}$-alkyl;
ii. a first titanium compound of formula $Ti(OR)_{4-y}X_y$, wherein R is an alkyl group of 1 to 6 C atoms, X is halogen, preferably Cl, and y is an integer of 1 to 4;
iii. a first internal electron donor selected from ethers comprising one or more ether groups;
iv. a second titanium compound of formula $Ti(OR)_{4-y}X_y$, wherein R is an alkyl group of 1 to 6 C atoms, X is halogen, preferably Cl, and y is an integer of 1 to 4, and wherein the first and the second titanium compound may be same or different, preferably same
v. a second internal electron donor, wherein the second internal donor is preferably the same as the first internal donor.

i. Solid Particles of $Mg(OR)_2$,

The present solid Ziegler-Natta catalyst component comprises solid particles of $Mg(OR)_2$ forming a basic carrier for the ZN catalyst component.

The solid particles of $Mg(OR)_2$ may be obtained by reacting a magnesium metal with an alcohol (ROH), like ethanol in the presence of a halogen or halogenated metal compound. A process for preparing such solid magnesium dialkoxide particles is disclosed for example in EP106108 and EP1283222 of Toho Catalyst.

The solid particles of $Mg(OR)_2$ may be used in granular, preferably in spherical form to prepare the present solid catalyst component (A).

The solid particles of $Mg(OR)_2$ may have a volume distribution-based median particle size ($D_{[v,0.5]}$) of 3 to 100 μm, preferably from 5 to 70 μm, more preferably from 5 to 50 μm, still more preferably from 5 to 20 μm. The particle size distribution (PSD), defined by Relative Span (($D_{[v,0.9]}$−$D_{[v,0.1]}$)/$D_{[v,0.5]}$), is preferably 2 or lower, more preferably 1.5 or lower, still more preferably 1.0 or lower.

In the $Mg(OR)_2$ group R is selected form $C_{1-4}$-alkyl groups. The alkyl groups are preferably the same. Preferably, $Mg(OR)_2$ is selected from magnesium dimethoxide, magnesium diethoxide and magnesium dipropoxide. Most preferably, $Mg(OR)_2$ is magnesium diethoxide. The solid particles of $Mg(OR)_2$ may suitably be provided as a suspension in a hydrocarbon solvent, preferably in an aromatic hydrocarbon solvent, when contacting the other compounds.

The amount of Mg in the final catalyst component, measured by the method as described in the experimental part and recalculated exclusive of volatiles content (dry catalyst component basis), is in the range of 10 to 25 wt %, typically in the range of 11 to 20 wt %, e.g. 12 to 18.

ii. And iv. Titanium Compounds

The first and second titanium compound is preferably a halogen-containing titanium compound of formula $Ti(OR)_{4-y}X_y$, wherein R is an alkyl group of 1 to 6 C atoms, X is halogen and y is an integer of 1 to 4. Preferably X is Cl. Most preferably, the titanium halide compound is $TiCl_4$. Preferably ii. and iv. are both titanium tetrachloride ($TiCl_4$).

The combined amount of titanium compounds ii. and iv. in the solid Ziegler-Natta catalyst component is preferably such that the Ti content in the range of 1.0 to 10.0 wt %, preferably 1.5 to 8.5 wt %, more preferably 4.0 to 8.0 wt %, of the total weight of the Ziegler-Natta catalyst component, measured by the method as described in the experimental part, and is recalculated exclusive of volatiles content (dry catalyst component basis).

iii. And v. Internal Electron Donor Compound

The term "internal electron donor" and "internal donor" have the same meaning in the present application. The internal donor, as used herein and hereafter, refers to a compound being part of the solid Ziegler-Natta catalyst component, i.e. added during the synthesis of the Ziegler-Natta catalyst component and typically acting as an electron donor in the solid Ziegler-Natta catalyst system.

The internal donor used according to the present invention is selected from ethers, derivatives and mixtures thereof. Catalyst components of the present invention comprise internal electron donors preferably selected from linear, branched or cyclic ethers. Said ethers comprise one or more ether groups. Thus, the ethers comprise one, two or more, e.g. three, ether groups. Ethers used as internal electron donors should not be known as harmful compounds in healthy and environmental point of view. Thus, e.g. THF (tetrahydrofuran) is not a desired ether to be used in the catalyst components of the present invention.

The amount of the internal donor in the solid Ziegler-Natta catalyst component depends on the molecular weight of the internal donor. As an illustrative example, if the donor is 2,2-di(2-tetrahydrofuryl)propane, the amount of donor is preferably from 2.0 to 25.0 wt %, preferably 4.0 to 20.0 wt % and more preferably 6.0 to 15.0 wt % of the total weight of the Ziegler-Natta catalyst component. The above amount of the internal donor is based on the method as described in the experimental part, and is recalculated exclusive of volatiles content (dry catalyst component basis).

According to a more preferred embodiment, the internal donor compound is selected from ethers of compounds of formula (I)-(VI):

Compound of Formula (I)

In a first example the internal donor internal donor compound is selected from compounds of formula (I)

(I)

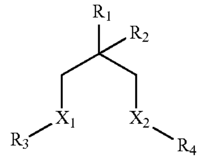

wherein

- $X_1$ and $X_2$ are each independently selected from O and $N(R_5)$;
- $R_1$ is selected from a group consisting of H, $C_{1-3}$-alkyl, and oxygen-containing heterocyclic ring; preferably selected from a group consisting of H, methyl, tetrahydrofuryl and furyl;
- $R_2$ is selected from H and methyl;
- $R_3$ and $R_4$ are independently selected from $C_{1-4}$-alkyl, preferably independently selected from $C_{1-2}$-alkyl, more preferably $R_3$ and $R_4$ are methyl;
- $R_5$ is selected from a group consisting of H, a linear, branched or cyclic $C_{1-8}$-alkyl group as an internal donor in a Ziegler-Natta catalyst, preferably selected from a group consisting of H, a linear or branched $C_{1-4}$-alkyl group.

According to one preferred embodiment the compound of formula (I) is selected from compounds of formula (I-a)

(I-a)

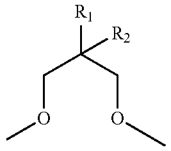

wherein

- $R_1$ is selected from a group consisting of H, $C_{1-3}$-alkyl, and oxygen-containing heterocyclic ring, preferably from a group consisting of H, methyl, tetrahydrofuryl and furyl, more preferably selected from a group consisting of H, methyl, 2-tetrahydrofuryl and 2-furyl; and
- $R_2$ is selected from H and methyl.

Compound of Formula (II)

In a second example an internal donor compound is selected from compounds of formula (II)

(II)

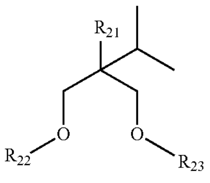

wherein

- $R_{21}$ is $C_{4-10}$-alkyl; and
- $R_{22}$ and $R_{23}$ are each independently $C_{1-3}$-alkyl.

Preferably, $R_{21}$ is linear or branched $C_{5-9}$-alkyl. More preferably, $R_{21}$ is selected from a group consisting of 3-methyl butyl and nonyl.

Preferably, $R_{22}$ and $R_{23}$ are each independently methyl or ethyl. More preferably, $R_{22}$ and $R_{23}$ are same and selected from methyl and ethyl.

In a particular example the compound of formula (II) is selected from a group consisting of 2-(3-methylbutyl)-2-isopropyl-1,3-dimethoxypropane, 2-(3-Methylbutyl)-2-isopropyl-1,3-diethoxypropane and 2-Nonyl-2-isopropyl-1,3-diethoxypropane.

Compound of Formula (III)

In a third example an internal donor compound is selected from compounds of formula (III)

(III)

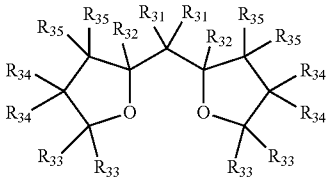

wherein

- $R_{31}$ to $R_{35}$ are the same or different and can be hydrogen, a linear or branched $C_1$ to $C_8$-alkyl group, or a $C_3$-$C_8$-alkylene group, or two or more of $R_{31}$ to $R_{35}$ can form a ring.

Examples of preferred linear or branched $C_1$ to $C_8$-alkyl groups are methyl, ethyl, n-propyl, i-propyl, n-butyl, sec-butyl, tert-butyl, pentyl and hexyl groups.

Examples for preferred $C_3$-$C_8$-alkylene groups are pentylene and butylene groups.

The two $R_{31}$ are preferably the same and are a linear $C_1$ to $C_4$-alkyl groups, more preferably methyl or ethyl; or the two $R_{31}$ form a ring with the carbon atom they are attached to a ring with 3 to 7 carbon atoms, preferably cyclopentyl or cyclohexyl ring. Most preferably both $R_{31}$ are methyl.

$R_{32}$ to $R_{35}$ are the same or different and are preferably H or a $C_1$ to $C_2$-alkyl groups, or two or more of $R_{32}$ to $R_{35}$ residues can form a ring. If one or more rings are formed by the residues $R_{32}$ to $R_{35}$, these are more preferably formed by $R_{35}$ and $R_{34}$ and/or $R_{34}$ and $R_{35}$.

Preferably, the residues $R_{32}$ to $R_{35}$ do not form rings and, more preferably, at most two of the residues $R_{32}$ to $R_{35}$ are a methyl, the others are H. Most preferably, $R_{32}$ to $R_{35}$ are all H.

Thus, the compound of formula (III) is preferably 2,2-di (2-tetrahydrofuryl)propane, or 2,2-di-(2-furan)-propane, more preferably 2,2-di(2-tetrahydrofuryl)propane.

Compound of Formula (IV)

In a fourth example the an internal donor internal donor compound is selected from compounds of formula (IV)

(IV)

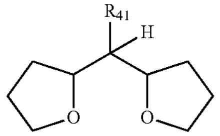

wherein

- $R_{41}$ is selected from a group consisting of H, $C_{1-3}$-alkyl, $$-CH_2OR_{42}$$

and oxygen-containing heterocyclic ring, $R_{42}$ is selected from a group consisting of a linear or branched or cyclic $C_{1-3}$-alkyl group, preferably, $R_{41}$ is selected from a group consisting of H, $C_{1-3}$-alkyl and tetrahydrofuryl, more preferably, $R_{41}$ is selected from a group consisting of H, methyl and 2-tetrahydrofuryl.

In a particular example, the compound of formula (IV) is selected from a group consisting of di(2-tetrahydrofuryl) methane (DTHFM), 1,1-di(2-tetrahydrofuryl)ethane (DTHFE), and tris(tetrahydrofuran-2-yl)methane (FFHFM).

Compound of Formula (V)

In a fifth example an internal donor compound is selected from compounds of formula (V)

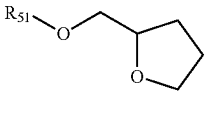

(V)

wherein $R_{51}$ is selected from a group consisting of $$-C(O)-R_{52},$$

and oxygen containing heterocyclic ring (Het); and $R_{52}$ is $C_{1-6}$-alkyl.

Preferably, $R_{51}$ is selected from a group consisting of $$-C(O)-R_{52}$$

wherein $R_{52}$ is $C_{2-4}$-alkyl, and saturated oxygen containing heterocyclic ring. More preferably, $R_{51}$ is selected from a group consisting of $$-C(O)-R_{52},$$

wherein $R_{52}$ is propyl, and tetrahydropyranyl.

In a first example of the Ziegler-Natta catalyst component, the compound of formula (V) is selected from compounds of formula (V-a)

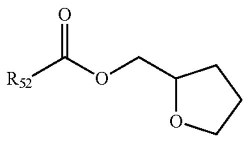

(V-a)

wherein $R_{52}$ is $C_{1-6}$-alkyl.

Preferably, $R_{52}$ is linear $C_{1-6}$-alkyl. More preferably, $R_{52}$ is $C_{2-4}$-alkyl. Even more preferably, $R_{52}$ is propyl.

In a second example of the Ziegler-Natta catalyst component, the compound of formula (V) is selected from compounds of formula (V-b)

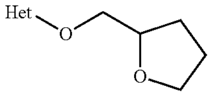

(V-b)

wherein

Het is oxygen containing heterocyclic ring.

Preferably, Het is saturated oxygen containing heterocyclic ring. More preferably, Het is tetrahydropyranyl. Even more preferably, Het is selected from a group consisting of 2-tetrahydropyranyl, 3-tetrahydropyranyl and mixtures thereof.

In a particular example, the compound of formula (V) is selected from a group consisting of tetrahydrofurfuryl butyrate, 2-(tetrahydrofurfuryloxy)tetrahydropyran and 3-(tetrahydrofurfuryloxy)tetrahydropyran.

Compound of Formula (VI)

In a sixth example the an internal donor internal donor compound is selected from compounds of formula (VI)

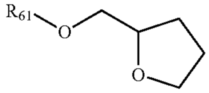

(VI)

wherein $R_{61}$ is a linear or branched $C_2$ to $C_6$-alkyl group, preferably a linear or branched $C_2$ to $C_4$-alkyl group, most preferably an ethyl group.

Thus, the compound of formula (VI) is preferably ethyl tetrahydrofurfuryl ether, n-propyl tetrahydrofurfuryl ether, isopropyl tetrahydrofurfuryl ether, n-butyl tetrahydrofurfuryl ether, sec-butyl tetrahydrofurfuryl ether, tert-butyl tetrahydrofurfuryl ether, or is mixtures thereof. Most preferably, the compound of formula (V) is ethyl tetrahydrofurfuryl ether.

Method for Producing the Solid Ziegler-Natta Catalyst Component

The following method can be given as an example of a preferable method for preparing the solid catalyst component of the present invention.

A suspension of dialkoxy magnesium is prepared by a method comprising the steps:

(a-i) suspending solid dialkoxymagnesium in an aromatic hydrocarbon compound such as toluene, and contacting the suspension with titanium halide, most preferably titanium tetrachloride, and an internal electron donor, as described above;

(a-ii) the mixture of step (a-i) is heated to and reacted at 70 to 120° C. a few hours, e.g. 1 to 4 hours, thereby obtaining a solid reaction product, i.e. a catalyst precursor;

(b) the solid reaction product of step (a-ii) is washed with an aromatic hydrocarbon solvent, e.g. toluene;

(c) titanium halide, preferably tetrachloride, the internal donor, as described above, and an aromatic hydrocarbon solvent, e.g. toluene, are added to the product of step (b) and the reaction mixture is heated to 70 to 120° C. and reacted a suitable time, like 0.5 to 2 hours;

d) the resulting product of step (c) is washed several times with a hydrocarbon solvent, preferably with an aliphatic hydrocarbon solvent, that is liquid at an ordinary temperature; and (e) the solid Ziegler-Natta catalyst component is recovered.

If desired and needed, contact with titanium tetrachloride can be repeated to modify the catalyst properties and performance.

Optionally, additional compounds may be added to the catalyst synthesis to further modify the catalyst.

The ratio of the compounds used for the preparation of the solid catalyst component cannot be generically defined, because such a ratio varies based on the process and type of compounds, i.e. titanium compound and internal electron donor, employed.

For example, the total amount of the titanium tetrachloride compound may be used in the amount from 0.5 to 100 mol, preferably from 0.5 to 50 mol, still more preferably from 1 to 10 mol per one mol of the magnesium compound, and the electron donor compound may be used in the amount from 0.01 to 10 mol, preferably from 0.01 to 1 mol, and still more preferably from 0.02 to 0.6 mol, per one mol of the magnesium compound.

The internal donor compound may be contacted with the solid Mg dialkoxide particles either simultaneously with or after the first titanium compound in step (a).

In the solid Ziegler-Natta catalyst component Mg/Ti mol/mol ratio is typically of 1 to 15, preferably 2 to 8, more preferably 3 to 7, still more preferably 4 to 6.5; and Cl/Ti mol/mol ratio is of 5 to 30, preferably 10 to 20.

The molar ratio of internal donor to Ti (Ti/donor mol/mol) is preferably from 0.005 to 10.0 mol/mol and more preferably from 0.01 to 10.0 mol/mol and even more preferably from 0.05 to 5.0 mol/mol.

The molar ratio of internal donor to Mg (Mg/donor) is preferably from 5 to 20 mol/mol and more preferably from 8 to 15 mol/mol and even more preferably from 8.5 to 13.5 mol/mol.

Preferably, the final solid Ziegler-Natta catalyst component particles have approximately the same particle size as the used solid Mg dialkoxy particles. The average particles size (i.e. median particle size, $D_{[v,0.5]}$) of the solid Ziegler-Natta catalyst component is in the range of 3 to 100 μm, preferably from 5 to 70 μm, more preferably from 5 to 50 μm, and still more preferably from 5 to 20 μm. The particle size distribution (PSD) of the catalyst component, defined by Relative Span $((D_{[v,0.9]}-D_{[v,0.1]})/D_{[v,0.5]})$ of the volume distribution, is preferably as narrow as possible, thus is preferably 2.0 or lower, more preferably 1.5 or lower, still more preferably 1.0 or lower.

Ziegler-Natta Catalyst

As indicated, the present Ziegler-Natta catalyst comprises (A) a Ziegler-Natta catalyst component as defined herein;

(B) a cocatalyst selected from metal compounds of Group 13 of the Periodic Table (IUPAC, 2005).

(B) Cocatalyst

A Ziegler-Natta catalyst component is typically used together with a cocatalyst, also known as activator. Suitable cocatalysts are compounds of Group 13 metal of the Periodic Table (IUPAC, 2005), typically Group 13 metal $C_{1-16}$-alkyl compounds and especially aluminium $C_{1-16}$-alkyl compounds. These compounds include trialkyl aluminium compounds, such as trimethylaluminium, triethylaluminium, tri-isobutylaluminium, trihexylaluminium and tri-n-octylaluminium, alkyl aluminium halides, such as ethylaluminium dichloride, diethylaluminium chloride, ethylaluminium sesquichloride, dimethylaluminium chloride and the like. Especially preferred activators are trialkylaluminiums, of which triethylaluminium, trimethylaluminium and tri-isobutylaluminium are particularly used.

The amount of the cocatalyst used depends on the specific catalyst and the cocatalyst. Typically triethylaluminium is used in such amount that the molar ratio of aluminium to the transition metal, like Al/Ti, is from 1 to 1000, preferably from 3 to 100 and in particular from about 5 to about 30 mol/mol.

The present Ziegler-Natta catalyst may also optionally comprise an external donor. External donors are not part of the solid catalyst component, but added as a separate compound to the polymerisation process. External donors typically include ether compounds, siloxane or silane type of external donors and/or alkyl halides as is known from prior art. Silanes are commonly used as external donors.

Polymerization of Ethylene

The present Ziegler-Natta catalyst components as defined herein, in particular Ziegler-Natta catalysts as defined herein are intended for polymerizing ethylene, optionally with $C_{3-20}$ comonomers.

Accordingly provided here is use of a Ziegler-Natta catalyst as defined herein in ethylene (co)polymerization, optionally with one or more $C_{3-20}$-comonomers.

Furthermore, provided herein is a method of olefin polymerization, in particular of ethylene (co) polymerization, comprising introducing into a polymerization reactor a Zeigler-Natta catalyst comprising a Ziegler-Natta catalyst component as defined herein.

Commonly used $C_{3-20}$-comonomers in ethylene polymerisation are α-olefin comonomers preferably selected from $C_{4-10}$-α-olefins, such as 1-butene, isobutene, 1-pentene, 1-hexene, 4-methyl-1-pentene, 1-heptene, 1-octene, 1-nonene and 1-decene, as well as dienes, such as butadiene, 1,7-octadiene and 1,4-hexadiene, or cyclic olefins, such as norbornene, and any mixtures thereof. Most preferably, the $C_{3-20}$-comonomer is 1-butene and/or 1-hexene.

The present Ziegler-Natta catalyst allows for the production of a wide range of polyethylene (co)polymers. Thus, production of high density, medium density and low-density ethylene (co)polymers is possible.

If copolymers are the desired end-product, the comonomer content of the ethylene copolymers can vary in wide ranges depending on the desired polymer properties. Thus, the comonomer content may vary from 0.1 wt % up to 20 wt %, preferably from 0.5 to 15 wt % and more preferably from 1.0 to 10 wt %.

In a particular example the present process for producing ethylene homo- or copolymers, comprises the steps of (P-a) introducing a Ziegler-Natta catalyst component (A) as defined herein into a polymerisation reactor, (P-b) introducing a cocatalyst (B) capable of activating the said Ziegler-Natta catalyst component into the polymerisation reactor, (P-c) introducing ethylene, optionally $C_3$-$C_{20}$ α-olefin comonomers, and optionally hydrogen into the polymerisation reactor; and (P-d) maintaining said polymerisation reactor in such conditions as to produce an ethylene homo- or copolymer.

The catalyst may be transferred into the polymerization zone by any means known in the art. It is thus possible to suspend the catalyst in a diluent and maintain it as homogeneous slurry. Especially preferred it is to use oil having a viscosity from 20 to 1500 mPa·s as diluent, as disclosed in WO2006/063771 A1. It is also possible to mix the catalyst with a viscous mixture of grease and oil and feed the resultant paste into the polymerization zone. Further still, it is possible to let the catalyst settle and introduce portions of thus obtained catalyst mud into the polymerization zone in a manner disclosed, for instance, in EP0428054 A1.

The polymerization in slurry usually takes place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the slurry polymerization is typically from 40 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. Hydrogen is fed, optionally, into the reactor to control the molecular weight of the polymer as known in the art.

Furthermore, one or more α-olefin comonomers may be added into the reactor to control the density and morphology of the polymer product. The actual amount of such hydrogen and comonomer feeds depends on the desired melt index (or molecular weight) and density (or comonomer content) of the resulting polymer.

The polymerization in gas-phase may be conducted in a fluidized bed reactor, in a fast-fluidized bed reactor or in a settled bed reactor or in any combination of these.

Typically, the fluidized bed or settled bed polymerization reactor is operated at a temperature within the range of from 50 to 100° C., preferably from 65 to 90° C. The pressure is suitably from 10 to 40 bar, preferably from 15 to 30 bar.

In addition, antistatic agent(s) may be introduced into the slurry and/or gas-phase reactor if needed.

The process may further comprise pre- and post-reactors.

The polymerization steps may be preceded by a pre-polymerisation step. The pre-polymerisation step may be conducted in slurry or in gas phase. Preferably, pre-polymerisation is conducted in slurry, and especially in a loop reactor. The temperature in the pre-polymerisation step is typically from 0 to 90° C., preferably from 20 to 80° C. and more preferably from 30 to 70° C.

The pressure is not critical and is typically from 1 to 150 bar, preferably from 10 to 100 bar.

The polymerisation may be carried out continuously or batch wise, preferably the polymerisation is carried out continuously.

The benefits of using the Ziegler-Natta catalyst component as herein defined, can especially seen in a multi-stage process for producing ethylene (co)polymers. Thus, preferably the process according to the present invention is a multi-stage process comprising at least two polymerisation stages, each of the stages comprising at least one polymerisation reactor. According to the preferred embodiment of the invention, the process comprises a slurry-phase polymerisation stage and a gas-phase polymerisation stage. One suitable reactor configuration comprises one to two slurry reactors, preferably loop reactors and one gas-phase reactor. Such polymerisation configuration is described e.g. in patent literature, such as in WO92/12182 A1, WO96/18662 A1 and WO2010054732 of *Borealis* and known as Borstar technology.

In a first example of the present process, polymerizing olefins is accomplished in a multi-stage polymerization process comprising at least one gas-phase reactor for producing ethylene (co)polymers.

In a second example of the present process, polymerizing ethylene with comonomers as herein discussed is accomplished in a multi-stage polymerization process comprising at least one slurry reactor, such as one or two slurry reactors, preferably two slurry reactors, and one gas-phase reactor.

Thus, according to an especially preferred embodiment the present invention relates to a process for producing ethylene copolymers comprising the steps (P-a) introducing a Ziegler-Natta catalyst component (A) as defined herein into a first polymerisation reactor R1, (P-b) introducing a cocatalyst (B) capable of activating the said Ziegler-Natta catalyst component into the polymerisation reactor R1, (P-c) introducing ethylene and optionally $C_4$-$C_{10}$ α-olefin comonomers, and optionally hydrogen into the polymerisation reactor R1; and (P-d) maintaining said polymerisation reactor R1 in such conditions as to produce an ethylene homo- or copolymer P1

(P-e) introducing the polymer P1 of step (P-d) to a second polymerisation reactor R2

(P-f) introducing additional ethylene, optionally $C_4$-$C_{10}$ α-olefin comonomers, and optionally hydrogen into the polymerisation reactor R2

(P-g) maintaining said polymerisation reactor R2 in such conditions as to produce an ethylene homo- or copolymer P2, being a reactor mixture of polymer P1 and polymer produced in the reactor R2

(P-h) introducing the polymer P2 of step (P-g) to a third polymerisation reactor R3

(P-i) introducing additional ethylene, $C_4$-$C_{10}$ α-olefin comonomers, and optionally hydrogen into the polymerisation reactor R3

(P-j) maintaining said polymerisation reactor R3 in such conditions as to produce an ethylene copolymer P3, being a reactor mixture of polymer P2 and polymer produced in the reactor R3, wherein reactors R1 and R2 are slurry loop reactors and reactor R3 is a gas-phase reactor.

If a prepolymerisation reactor, R0, precedes reactor R1, then the reactor R1 is a combination of reactors R0 and R1 as above.

Polymer Properties

By utilizing the present Ziegler-Natta catalyst component and, in particular using it according to the present process, it is possible to produce ethylene (co)polymers with desirable Mw and comonomer content keeping the productivity on a good level and within a desired activity balance between the reactors, as shown by the examples.

Especially an optimal combination of molar mass variability, comonomer response, and activity balance between reactors and total productivity as well as improved structural integrity of (co)polymers makes the utilization of the present internal donors in Ziegler-Natta catalysts very attractive for producing polyethylene.

MFR values (measured according to ISO1133, at 190° C. with 2.16 kg, 5 kg or 21.6 kg loads) may vary within a wide variety based on the targeted end application needs. MFR of the final polymer may be regulated e.g. by controlling the amount of hydrogen in the process, as is well known in the art. Typically, the final polymer has a density of from 900 to 965 kg/$m^3$, depending on the needs of the desired end applications. Density of polyethylene may be regulated e.g. by controlling the comonomer incorporation.

EXPERIMENTAL

Analytical Methods

Al, Mg, Ti Contents in a Catalyst Component by ICP-OES

The sample consisting of dry catalyst component powder is mixed so that a representative test portion can be taken. Approximately 20-50 mg of material is sampled in inert atmosphere into a 20 mL volume vial and the exact weight of powder recorded.

A test solution of known volume (V) is prepared in a volumetric flask as follows. Sample digestion is performed in the cooled vial by adding a small amount of deionized and distilled (DI) water (5% of V), followed by adding concentrated nitric acid (65% $HNO_3$, 5% of V). The mixture is transferred into a volumetric flask. The solution diluted with DI water up to the final volume V, and left to stabilise for two hours.

The elemental analysis of the resulting aqueous samples is performed at room temperature using a Thermo Elemental iCAP 6300 Inductively Coupled Plasma—Optical Emission Spectrometer (ICP-OES). The instrument is calibrated for Al, Ti and Mg using a blank (a solution of 5% $HNO_3$) and six standards of 0.5 ppm, 1 ppm, 10 ppm, 50 ppm, 100 ppm and 300 ppm of Al, Ti and Mg in solutions of 5% $HNO_3$ DI water. Curvelinear fitting and 1/concentration weighting is used for the calibration curve.

Immediately before analysis the calibration is verified and adjusted (instrument function named "re-slope") using the blank and a 300 ppm Al, 100 ppm Ti, Mg standard. A quality control sample (QC; 20 ppm Al and Ti, 50 ppm Mg in a solution of 5% $HNO_3$ in DI water) is run to confirm the re-slope. The QC sample is also run after every $5^{th}$ sample and at the end of a scheduled analysis set.

The content of magnesium is monitored using the 285.213 nm line and the content for titanium using 336.121 nm line. The content of aluminium is monitored via the 167.079 nm line, when Al concentration in test portion is between 0-10 wt % and via the 396.152 nm line for Al concentrations above 10 wt %.

The reported values are an average of results of three successive aliquots taken from the same sample and are related back to the original catalyst sample based on input into the software of the original weight of test portion and the dilution volume.

Cl Content in a Catalyst Component by Potentiometric Titration

Chloride content of catalyst components is determined by titration with silver nitrate. A test portion of 50-200 mg of a catalyst component is weighed under nitrogen in a septum-sealed vial. A solution of 1 part of concentrated $HNO_3$ (68%, analytical grade) and 4 parts of distilled (DI) water are added to the sample in an aliquot of 2.5 mL using a syringe. After the reaction completion and dissolution of the catalyst component material, the solution is transferred into a titration cup using an excess of DI water. The solution is then immediately titrated with a commercially certified solution of 0.1 M $AgNO_3$ in a Mettler Toledo T70 automatic titrator. The titration end-point is determined using an Ag-electrode. The total chloride amount is calculated from the titration and related to the original sample weight.

Volatiles and DTHFP Content in a Catalyst Component by GC-MS

A test solution using a 40-60 mg test portion of catalyst component powder is prepared by liquid-liquid extraction of the sample and an internal standard in water and dichloromethane: first, 10 mL of dichloromethane are added to the test portion, followed by addition of 1 ml of the internal standard solution (Dimethyl pimelate, 0.71 vol % in deionised water) using a precision micro-syringe. The suspension is sonicated for 30 min and left undisturbed for phase to separation. A portion of the test solution is taken from the organic phase and filtered using a 0.45 μm syringe filter.

For the calibration, five standard stock solutions with different analyte concentrations are prepared by dosing five increasing portions of analyte standard materials accurately into volumetric flasks and filling up to mark with methanol. For the preparation of the calibration samples, aliquots of 200 μl from the stock solutions are extracted with the aqueous ISTD solution and dichloromethane in the same volume ratios as for the samples. The analyte amount in the final calibration samples ranges from 0.1 mg to 15 mg.

The ratios of rac-DTHFP to meso-DTHFP in the standard DTHFP material (obtained from TCI) and additionally in a meso-isomer-enriched DTHFP material (obtained from Thomas Swan & Co. Ltd) was confirmed separately by 1H-NMR and GC-FID techniques and the data was used for calculating the mass balance, isomer peak retention and elution order.

The measurement is performed using an Agilent 7890B Gas Chromatograph equipped with an Agilent 5977A Mass Spectrometer Detector. The separation is achieved using a ZB-XLB-HT Inferno 60 m×250 μm×0.25 μm column (Phenomenex) with midpoint backflush through a three channel auxiliary EPC and a pre-column restriction capillary of 3 m×250 μm×0 μm. The initial oven temperature is 50° C. and the hold time is 2 min. The oven ramp consists of a first stage of 5° C./min to 150° C. and a second stage of 30° C./min to 300° C. followed by a 1 minute post-run backflush at 300° C.

The inlet operates in split mode. Injection volume is 1 μL, inlet temperature 280° C., septa purge 3 mL/min, total flow 67.875 mL/min and split ratio 50:1. Carrier gas is 99.9996% He with pre-column flow of 1.2721 mL/min and additional flow of 2 mL/min from the backflush EPC to the analytical column. The MS detector transfer line is kept at 300° C. The MSD is operated in Electron Impact mode at 70 eV and Scan mode ranging from 15-300 m/z.

The signal identities are determined by retention times (Heptane 4.8, Toluene 6.3, rac-DTHFP 23.4, meso-DTHFP 23.0, Dimethyl pimelate 23.2) and target ion m/z (Heptane 71.1, Toluene 91.1, rac-DTHFP 71.1, meso-DTHFP 71.1, Dimethyl pimelate 157.1). Additionally qualifier ions are used for confirmation of the identification (Heptane, Toluene). The target ion signals of each analyte and the internal standard are integrated and compared to calibration curve, established in the beginning of each run with the five calibration samples. The calibration curves for the response ratios are linear without sample concentration weighting. A quality control sample is used in each run to verify the standardisation. All test solutions are run in two replicate runs. The mass of the test portion is used for calculating the analyte concentration in the sample for both replicates and the result reported as the average.

Particle Size Distribution of Catalyst Component Powder

The particle size distribution of the inventive catalyst component is measured using the laser diffraction particle size analyser Malvern Mastersizer 3000. Sample dispersion: dry powder.

The following particle size and particle size distribution indicators are used in the experiments: $D_{[v,0.1]}$, $D_{[v,0.5]}$, $D_{[v,0.9]}$ and Relative Span.

Relative Span (also called PSD index) is defined by the following equation:

$$\text{Relative Span} = \frac{D[v, 0.9] - D[v, 0.1]}{D[v, 0.5]}$$

wherein $D_{[v,0.5]}$ represents the median particle diameter of the volume distribution, $D_{[v,0.9]}$ represents the particle diameter for which 90% of the population lies below the $D_{[v,0.9]}$ diameter; $D_{[v,0.1]}$ represents the particle diameter for which 10% of population lies below the $D_{[v,0.1]}$ diameter.

Particle Size Distribution of Polymer Powder

Particle size distribution is measured in accordance with ISO 13320-1 with a Coulter LS 200 particle size analyzer. The instrument is able to measure the particle size distribution in a range of 0.4-2000 μm. The method is a laser diffraction method, where a laser beam is directed at the sample travelling in a flow-through cuvette. n-Heptane is used as the sample fluid.

The polymer sample is first pre-treated by screening out particles larger than 2 mm. The screened sample is mixed with isopropanol and put in an ultra-sound device in order to separate the particles from each other. The pre-treated sample is then placed in the sample unit and analysed. The result is calculated using a computer program provided with the instrument.

The following particle size and particle size distribution indicators are used in the experiments: $D_{[v,0.1]}$, $D_{[v,0.5]}$, $D_{[v,0.9]}$ and Relative Span as defined above.

Melt Index (MI) or Melt Flow Rate (MFR)

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance, $MFR_2$ is measured under 2.16 kg load, $MFR_5$ is measured under 5 kg load and $MFR_{21}$ is measured under 21.6 kg load.

Polymer Density

Density of polymers is measured according to ISO 1183-2/1872-2B.

EXAMPLES

Inventive Catalyst Component Example 1—ICE1, Catalyst Provided by Toho Titanium Preparation of Inventive Solid Catalyst Component A 500 ml flask equipped with a stirrer, of which the internal atmosphere had been sufficiently replaced with nitrogen gas, was charged with 20 g (174.8 mmol) of diethoxymagnesium, 200 ml of toluene, 60 ml of titanium tetrachloride, and 2.2 ml (11.9 mmol) of 2,2-di(2-tetrahydrofuryl)propane. The mixture was heated to 90° C. The mixture was then reacted at 90° C. for 120 minutes. After completion of the reaction, the resulting reaction product was washed four times with 200 ml toluene. After the addition of 160 ml of toluene, 2.6 ml (14.1 mmol) of 2,2-di(2-tetrahydrofuryl)propane and 60 ml of titanium tetrachloride, the mixture was heated to 80° C., and stirred and reacted for 60 minutes. The mixture was then washed 7 times with 200 ml of n-heptane to obtain a solid catalyst component. The solid catalyst component was subjected to solid-liquid separation. Analytical results of the inventive catalyst component are disclosed in Table 1. Median volume distribution-based Particle Size ($D_{[v,0.5]}$) of ICE1 was 15 μm, $D_{[v,0.9]}$ was 23 μm and $D_{[v,0.1]}$ was 10 μm. Relative Span (($D_{[v,0.9]}$−$D_{[v,0.1]}$)/$D_{[v,0.5]}$) was 0.9.

Comparative Catalyst component example 1—CCE1: Preparation of Comparative solid catalyst component. The comparative catalyst component is prepared following the preparation procedure similar to the one described in WO2016097193.

Procedure for Comparative Catalyst Component Preparation

In an inert atmosphere glovebox a dry 300 mL, 4-neck round-bottom flask, equipped with two rubber septa, a thermometer and a mechanical stirrer, was charged with 0.56 g of 2,2-Di(2-tetrahydrofuryl)propane (DTHFP/Mg=0.1 mol/mol) (obtained from TCI) of dissolved in 40 mL of heptane and with 7.01 g (30 mmol of Mg) of granular 21 μm ($D_{[v,0.5]}$) $MgCl_2$*3EtOH carrier (obtained from Grace). The flask was removed from the glovebox, a nitrogen inlet and an outlet were connected. The flask was placed in a cooling bath and tempered at 0° C. for approximately 10 min at 335 rpm. Triethylaluminium 10 wt % solution in heptane (107.55 g, 94.2 mmol Al; Al/EtOH=1.0 mol/mol) was added dropwise to the stirred suspension within 1 h, keeping the reaction mixture temperature below 5° C. The obtained suspension was heated to 80° C. within 20 min and kept at this temperature for further 30 min at 335 rpm. The suspension was left to settle for 5 min at 80° C. and the supernatant was removed using a cannula. The obtained pre-treated support material was washed twice with 70 mL of toluene at room temperature (adding toluene, stirring at 250 rpm for 15-120 min, settling for 5 min and siphoning the liquid phase off).

At room temperature, 70 mL of toluene was added to the pre-treated support material. To this suspension stirred at 335 rpm, neat $TiCl_4$ (3.3 mL, 30 mmol; Ti/Mg=1.0 mol/mol) was added drop-wise and the reaction mixture temperature was maintained between 25-35° C. The obtained suspension was heated to 90° C. within 20 min and stirred at this temperature for further 60 min at 335 rpm. The suspension was left to settle for 5 min at 90° C. and the supernatant was removed using a cannula. The obtained catalyst component was washed twice with 70 mL of toluene at 90° C. and once with 70 mL of heptane at room temperature (each wash involving adding toluene or heptane, stirring at 335 rpm for 15 min, settling for 5 min and siphoning the liquid phase off). The catalyst component was dried in vacuo at 70° C. for 30 min.

Analytical results are disclosed in Table 1. Results are based on compositions including volatiles.

TABLE 1

Catalyst Component composition of Inventive and Comparative solid Catalyst Components ICE1 and CCE1

| Catalyst | Ti (wt %) | Mg (wt %) | Al (wt %) | Cl (wt %) | DTHFP (wt %) | Volatiles (wt %) | Mg/Ti (mol/mol) | Mg/DTHFP (mol/mol) |
|---|---|---|---|---|---|---|---|---|
| ICE1 | 5.3 | 13.9 | 0.0 | 52.3 | 10.0 | 8.8 | 5.1 | 10.6 |
| CCE1 | 7.5 | 14.3 | 0.9 | 57.4 | 10.5 | 7.1 | 3.8 | 10.4 |

POLYMERISATION EXAMPLES

Comparative Polymerisation Examples 1 to 5 (CE1 to CE5) and Inventive Polymerisation Examples 1 to 4 (IE1 to IE4)

Catalysts components prepared according to the procedure of Inventive Catalyst Component Example 1 (ICE1) and Comparative Catalyst Component Example 1 (CCE1) together with TEAL (triethylaluminium) with Al/Ti ratio of 15 mol/mol were used in ethylene-hexene copolymerisation in a multi-stage reactor configuration comprising a prepolymerisation reactor, two slurry-loop reactors and one gas-phase reactor. Temperature in the prepolymerisation reactor was 60° C., in the slurry reactors 95° C. and in the gas-phase reactor 85° C. Polymerisation conditions and results are disclosed in Table 2.

TABLE 2

Polymerisation conditions and results

| | Example | | | | | | | | |
|---|---|---|---|---|---|---|---|---|---|
| | IE1 | IE2 | IE3 | IE4 | CE1 | CE2 | CE3 | CE4 | CE5 |
| Prepoly reactor | | | | | | | | | |
| Catalyst feed (g/h) | 10.0 | 10.0 | 10.0 | 9.9 | 9.5 | 9.2 | 9.2 | 9.0 | 9.5 |
| Pressure (MPa) | 5.6 | 5.6 | 5.6 | 5.6 | 5.7 | 5.8 | 5.8 | 5.8 | 5.8 |
| $1^{st}$ loop reactor | | | | | | | | | |
| Pressure (MPa) | 5.5 | 5.5 | 5.5 | 5.5 | 5.6 | 5.6 | 5.6 | 5.6 | 5.6 |
| $C_2$ conc. (mol %) | 3.1 | 3.0 | 3.0 | 3.0 | 3.9 | 4.5 | 4.3 | 4.5 | 4.4 |
| $H_2/C_2$ ratio (mol/kmol) | 690 | 700 | 700 | 700 | 480 | 460 | 480 | 500 | 720 |
| 1st loop split (wt %)* | 20 | 20 | 20 | 20 | 20 | 20 | 20 | 20 | 21 |
| $MFR_2$ (g/10 min) | 48 | 96 | 103 | 80 | 112 | 77 | 137 | 110 | 91 |
| $2^{nd}$ loop reactor | | | | | | | | | |
| Pressure (MPa) | 5.3 | 5.3 | 5.3 | 5.3 | 5.1 | 5.1 | 5.1 | 5.1 | 5.1 |
| $C_2$ conc. (mol %) | 4.2 | 4.1 | 4.0 | 4.1 | 3.8 | 4.0 | 3.7 | 3.5 | 5.0 |
| $H_2/C_2$ ratio (mol/kmol) | 540 | 550 | 570 | 560 | 620 | 600 | 630 | 650 | 730 |
| $2^{nd}$ loop split (wt %) | 28 | 28 | 28 | 28 | 29 | 29 | 28 | 28 | 28 |
| $MFR_2$ (g/10 min) | 184 | 192 | 219 | 220 | 152 | 212 | 202 | 263 | 168 |
| Gas phase reactor | | | | | | | | | |
| Pressure (MPa) | 2.0 | 2.0 | 2.0 | 2.0 | 2.0 | 2.0 | 2.0 | 2.0 | 2.0 |
| $C_2$ conc. (mol %) | 13.1 | 13.0 | 12.9 | 13.1 | 4.4 | 4.9 | 5.1 | 4.7 | 3.2 |
| $H_2/C_2$ ratio (mol/kmol) | 50 | 52 | 53 | 52 | 32 | 45 | 44 | 55 | 48 |
| $C_6/C_2$ ratio (mol/kmol) | 34 | 36 | 37 | 40 | 63 | 43 | 48 | 50 | 62 |
| GPR split (wt %) | 52 | 52 | 52 | 52 | 51 | 51 | 52 | 52 | 51 |
| Polymer Powder | | | | | | | | | |
| Productivity ($kg_{PE}/g_{cat}$) | 8.5 | 8.4 | 8.6 | 8.5 | 8.8 | 9.1 | 9.4 | 9.6 | 8.2 |
| Bulk density (kg/$m^3$) | | 434 | | 435 | 356 | | 361 | 363 | |
| Density (kg/$m^3$) | 948 | 949 | 948 | 948 | 947 | 950 | 948 | 949 | 947 |
| $MFR_5$ (g/10 min) | 0.16 | 0.18 | 0.17 | 0.18 | 0.21 | 0.23 | 0.19 | 0.35 | 0.21 |
| $MFR_{21}$ (g/10 min) | 4.2 | 4.8 | 4.6 | 4.8 | 6.9 | 6.7 | 5.3 | 9.2 | 6.8 |
| $D_{[v, 0.1]}$ (μm) | 128 | 128 | 132 | 121 | 93 | 79 | 87 | 83 | 81 |
| $D_{[v, 0.5]}$ (μm) | 298 | 296 | 298 | 300 | 302 | 276 | 289 | 315 | 269 |
| $D_{[v, 0.9]}$ (μm) | 550 | 522 | 527 | 559 | 730 | 643 | 703 | 810 | 626 |
| Relative Span | 1.4 | 1.3 | 1.3 | 1.5 | 2.1 | 2.0 | 2.1 | 2.3 | 2.0 |

*split = prepol + 1-loop reactor

Figure 2:
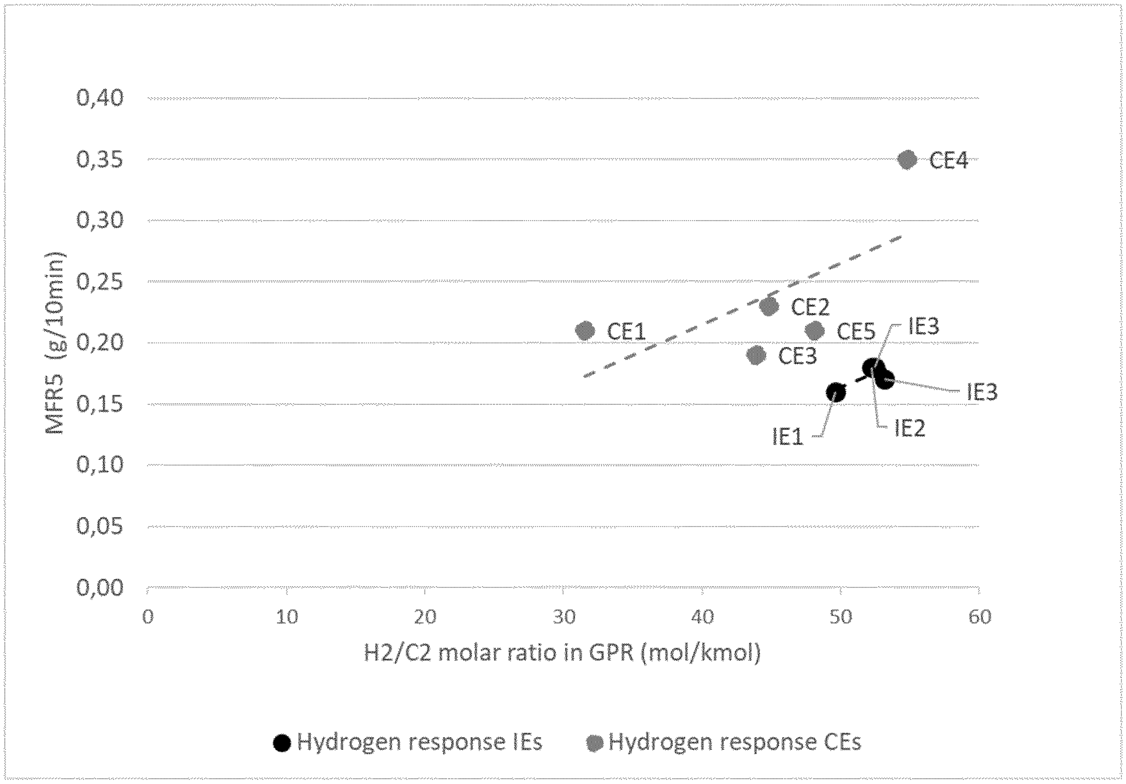
FIG. 2 illustrates hydrogen response in GPR reactor of a multi-stage reactor configuration for producing ethylene-hexene copolymer with comparative and inventive catalysts.
Figure 3:
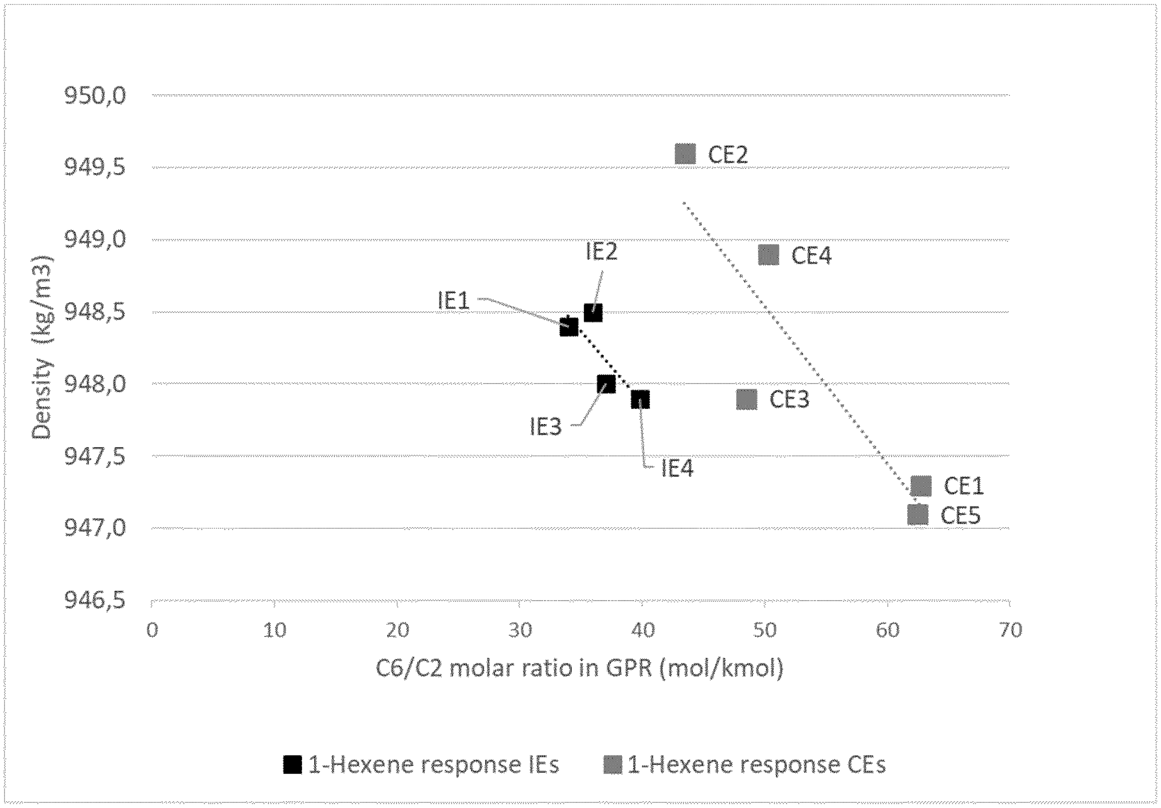
FIG. 3 illustrates 1-hexene (comonomer) response in GPR reactor of a multi-stage reactor configuration for producing ethylene-hexene copolymer with comparative and inventive catalysts.

It can be seen from the results above, and in the FIGS. 1, 2 and 3 the following: In the inventive process, an improved activity balance between loop and the gas phase reactor (GPR) was achieved favoring production of high Mw copolymers. The higher the ethylene partial pressure (molar concentration) is in the gas phase reactor, the lower $H_2/C_2$ ratio can be reached and the more stable it is. In the inventive examples, the ethylene molar concentration in the gas phase reactor is almost three times higher than in the comparative examples, while total catalyst productivity remains on the same level.

Figure 4:
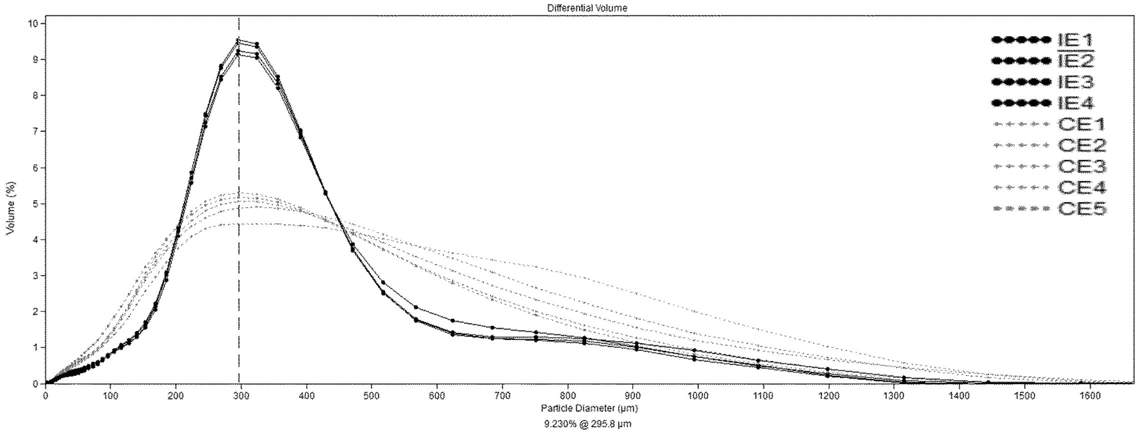
FIG. 4 illustrates particle size distributions of ethylene-hexene copolymers produced in GPR reactor of a multi-stage reactor configuration with comparative and inventive catalysts.

Further, an improved Mw capacity (lower hydrogen response) and improved 1-hexene response were achieved in the gas phase reactor favoring production of high Mw copolymers. In addition, it can be seen from the results above, and in the FIG. 4 the following:

In the inventive process, an improved structural integrity of polymer was achieved favoring continuous operations. Specifically, reduced amount of fines below 100 μm and narrower Relative Span were observed compared to the comparative examples, as well as significantly increased bulk density in the gas phase reactor compared to the comparative examples.

The invention claimed is:

1. A process for producing ethylene polymer in a polymerization process comprising polymerization of ethylene, optionally with comonomers selected from $C_3$-$C_{20}$-alpha-olefins, in the presence of a Ziegler-Natta catalyst under polymerization conditions in at least one polymerization stage carried out in a gas-phase reactor, wherein the Ziegler-Natta catalyst comprises (A) a solid Ziegler-Natta catalyst component and (B) a cocatalyst wherein the process further comprises preparing the solid Ziegler-Natta catalyst component (A) by a method comprising the steps of:

(a) contacting a solid magnesium alkoxide compound with a-i) a compound of a first transition metal of Group 4 to 6 of IUPAC Periodic table, and a-ii) a first internal electron donor compound to obtain a solid catalyst precursor;

(b) optionally washing the solid catalyst precursor of step (a);

(c) contacting the solid catalyst precursor of step (a) or (b) with c-i) a second compound of a transition metal of Group 4 to 6 of IUPAC Periodic table, and c-ii) a second internal electron donor compound;

(d) washing the product of step (c); and (e) recovering the solid Ziegler-Natta catalyst component.

2. The process according to claim 1, wherein the solid Ziegler-Natta catalyst component is obtained from compounds comprising i. solid particles of magnesium dialkoxide of formula $Mg(OR)_2$, wherein each R is independently $C_{1-4}$-alkyl;

ii. a first titanium compound of formula $Ti(OR)_{4-y}X_y$, wherein R is an alkyl group of 1 to 6 C atoms, X is halogen, and y is an integer of 1 to 4;

iii. a first internal electron donor selected from ethers comprising one or more ether groups;

iv. a second titanium compound of formula $Ti(OR)_{4-y}X_y$, wherein R is an alkyl group of 1 to 6 C atoms, X is halogen, and y is an integer of 1 to 4, and wherein the first and the second titanium compound may be same or different;

v. a second internal electron donor.

3. The process according to claim 1, wherein the solid magnesium alkoxide compound is selected from magnesium dimethoxide and magnesium diethoxide.

4. The process according to claim 1, wherein the solid Ziegler-Natta catalyst component has a volume distribution-based median particle size ($D_{[v,0.5]}$) of 3 to 100 μm.

5. The process according to claim 1, wherein the solid magnesium alkoxide compound is provided as a suspension in an aromatic hydrocarbon.

6. The process according to claim 1, wherein the titanium compound is a chlorine containing titanium compound of formula $Ti(OR)_{4-y}X_y$, wherein R is an alkyl group of 1 to 6, and y is an integer of 1 to 4.

7. The process according to claim 1, wherein the internal electron donor is selected from linear, branched or cyclic ethers comprising one or more ether groups, and derivatives and mixtures thereof.

8. The process according to claim 1, wherein the internal electron donor is selected from ethers of compounds of formula (I)-(VI):

(I)

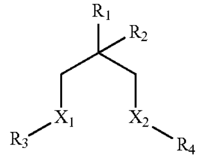

wherein $X_1$ and $X_2$ are each independently selected from O and $N(R_5)$;

$R_1$ is selected from a group consisting of H, $C_{1-3}$-alkyl, and oxygen-containing heterocyclic ring; preferably selected from a group consisting of H, methyl, tetrahydrofuryl and furyl;

$R_2$ is selected from H and methyl;

$R_3$ and $R_4$ are independently selected from $C_{1-4}$-alkyl;

$R_5$ is selected from a group consisting of H, a linear, branched or cyclic $C_{1-8}$-alkyl group;

(II)

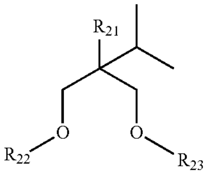

wherein $R_{21}$ is $C_{4-10}$-alkyl;

and $R_{22}$ and $R_{23}$ are each independently $C_{1-3}$-alkyl;

(III)

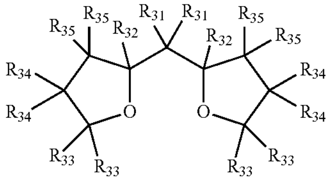

wherein

R31 to R35 are the same or different and can be hydrogen, a linear or branched C1 to C8-alkyl group, or a C3-C8-alkylene group, or two or more of $R_{31}$ to $R_{35}$ can form a ring;

(IV)

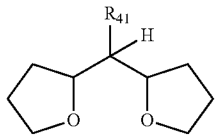

wherein $R_{41}$ is selected from a group consisting of H, $C_{1-3}$-alkyl, $-CH_2OR_{42}$ and oxygen-containing heterocyclic ring, $R_{42}$ is selected from a group consisting of a linear or branched or cyclic $C_{1-8}$-alkyl group;

(V)

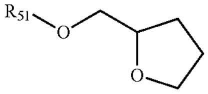

wherein $R_{51}$ is selected from a group consisting of $-C(O)-R_{52}$, where $R_{52}$ is $C_{1-6}$-alkyl, and oxygen containing heterocyclic ring (Het);

(VI)

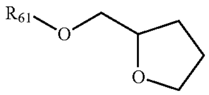

wherein $R_{61}$ is a linear or branched C2 to C6-alkyl group.

9. The process according to claim 1, wherein the internal donor compound is selected from a group consisting of 1,3-dimethoxypropane, 1,3-dimethoxy-2-methylpropane, 2,2-Dimethyl-1,3-dimethoxypropane, 2-(1,3-dimethoxypropan-2-yl)tetrahydrofuran, 2-(1,3-dimethoxypropan-2-yl)furan, 2-(1,3-dimethoxy-2-methylpropan-2-yl)tetrahydrofuran, 2-(1,3-dimethoxy-2-methylpropan-2-yl)furan, 3-methoxy-N,N-dimethylpropan-1-amine, 2-(3-methylbutyl)-2-isopropyl-1,3-dimethoxypropane, 2-(3-Methylbutyl)-2-isopropyl-1,3-diethoxypropane, 2-Nonyl-2-isopropyl-1,3-diethoxypropane, di(2-tetrahydrofuryl)methane, 1,1-di(2-tetrahydrofuryl)ethane, tris(tetrahydrofuran-2-yl)methane, tetrahydrofurfuryl butyrate, 2-(tetrahydrofurfuryloxy)tetrahydropyran, 3-(tetrahydrofurfuryloxy)tetrahydropyran, 2,2-di(2-tetrahydrofuryl)propane and 2,2-di-(2-furan)-propane, and any mixtures thereof.

10. The process according to claim 1, wherein the internal donor is 2,2-di(2-tetrahydrofuryl)propane, or 2,2-di-(2-furan)-propane.

11. The process according to claim 1, wherein the final solid catalyst component has a Mg/Ti mol/mol ratio of 1 to 15, Cl/Ti mol/mol ratio of 5 to 30, Ti/donor mol/mol ratio of 0.005 to 10.

12. The process according to claim 1, wherein the process comprises the steps of (P-a) introducing a Ziegler-Natta catalyst component (A) into a polymerization reactor, (P-b) introducing a cocatalyst (B) capable of activating the said Ziegler-Natta catalyst component into the polymerization reactor, (P-c) introducing ethylene, optionally $C_3$-$C_{20}$ α-olefin comonomers, and optionally hydrogen into the polymerization reactor; and (P-d) maintaining said polymerization reactor in such conditions as to produce an ethylene homo- or copolymer.

13. The process according to claim 12, wherein ethylene polymerization is accomplished in a multi-stage polymerization process comprising at least one gas-phase reactor for producing olefin polymers.

14. The process according to claim 12, wherein olefin polymerization is accomplished in a multi-stage polymerization process comprising at least one slurry reactor, and one gas-phase reactor.

15. The process according to claim 1, wherein the solid magnesium alkoxide compound is a compound of formula $Mg(OR)_2$, wherein R is $C_{1-4}$-alkyl.

16. The process according to claim 1, wherein the compound of a transition metal of Group 4 to 6 of IUPAC Periodic table is a tetravalent titanium compound.

17. The process according to claim 2, wherein the first and the second titanium compound are the same.

18. The process according to claim 2, wherein the second internal electron donor is the same as the first internal electron donor.

19. The process according to claim 4, wherein the solid Ziegler-Natta catalyst component has a particle size distribution (PSD), defined by Relative Span $((D_{[v,0.9]}-D_{[v,0.1]})/D_{[v,0.5]})$, of 2 or lower.

20. The process according to claim 12, wherein olefin polymerization is accomplished in a multi-stage polymerization process comprising two slurry reactors and one gas-phase reactor.

* * * * *